UNITED STATES PATENT OFFICE 2,265,388

CATALYTIC CONVERSION PROCESS

Ralph M. Melaven, Highland, Ind., and Rodney V. Shankland, Chicago, Ill., assignors to Standard Oil Company, Chicago, Ill., a corporation of Indiana No Drawing. Application February 2, 1939, Serial No. 254,234

7 Claims. (Cl. 196—52)

This invention relates to the conversion of hydrocarbon oils in the presence of catalysts and particularly to the conversion of heavy hydrocarbon oils, such as gas oil, petroleum residuums, hydrocarbon waxes, etc., into lower boiling hydrocarbons, particularly gasoline. The invention relates more particularly to the preparation of new catalysts for the conversion of heavy hydrocarbon oils at high temperatures. One of the objects of the invention is to provide a catalyst which will convert a larger amount of the oil into gasoline before it becomes necessary to regenerate it. Another object of the invention is to provide a catalyst which may be repeatedly regenerated by treatment with an oxygen containing gas for removal of carbonaceous matter without significant loss of catalyst activity. Still another object of the invention is to provide a catalyst of great physical strength which may be employed in granular form without serious disintegration. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of $Na_2(SiO_3)_x$. In this formula $x$ is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength.

After adding the silicate solution to the acid, and mixing, it is allowed to stand and soon the solution solidifies to a jelly. This is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. If desired, the gel may be washed only partially at first, then partly dried and finally washed until the water gives no further test for acid ion. Also, the gel may be further washed with distilled water after final drying.

The next step in the preparation of our improved catalyst is to subject the gel to the action of a soluble salt of nickel under conditions such that a layer of insoluble nickel compound is deposited on the interior pore surface of the gel. Heretofore, attempts have been made to deposit nickel compounds on silica gel but these attempts have usually not succeeded in accomplishing more than depositing the nickel compound on the external surface of the silica gel grains. Because of the extremely small dimensions of the pores, which are of the order of 5 millimicrons in diameter, these are apparently plugged by precipitates and great care must be exercised to prevent the formation of a heavy precipitate. This we avoid by maintaining the gel in a slightly acid condition and the presence of basic precipitating reagents is scrupulously avoided.

Instead of preparing a silica gel, we may also employ precipitated silica which may be prepared according to the following procedure. Commercial water glass is diluted with an equal volume of distilled water and to this solution is added, with stirring, hydrochloric acid of 5 N. concentration until there is present about 20% of acid in excess of that required to neutralize the water glass. Sulfuric acid may also be used. The precipitated silica is then washed with hot distilled water until the washings test free of chloride. About 100 grams of the moist precipitate is digested for two hours with about 3 liters of 0.1 molar nickel sulfate solution on a steam bath. This treatment causes a hydrolysis of the nickel sulfate accompanied by a deposition of a nickel compound on the surface of the silica which we believe to be an adsorbed layer of active nickel-silica compound.

The treated silica was washed three times by decantation with distilled water followed by two washings of hot water and two washings of cold water on a suction funnel using about 300 ml. of water for each washing. The washed material was finally pelleted and dried at 210 to 220° F. in a steam heated drying oven, after which it was ready for use as a catalyst for promoting cracking of gas oil. It is estimated that the amount of nickel in the dried catalyst was about 0.5 wt. per cent.

When activating the gel with nickel salt, we prefer to maintain the solution slightly acid corresponding to a hydrogen ion concentration of about 2 to 7 pH. The hydrogen ion concentration will usually increase during the activation treatment. For example, in one case the pH was 6.1 at the start and 5.3 at the end of a two hour treatment of silica at 200° F. with 0.1 molar solution of nickel formate.

We prefer to employ this catalyst for the cracking of hydrocarbon oils at temperatures of about 700 to 1050° F., employing contact times of between about ½ second to 5 minutes, preferably contact times within the range of 1 second to 1 minute. Contact time referred to is the time required for one volume of oil vapor at the condition of experiment to pass one volume of catalyst. We prefer to employ our new catalyst at relatively low pressures, for example, atmospheric to 50 lbs. per square inch gage. However, somewhat higher pressures, e. g., 100 to 200 lbs. per square inch may be used.

As an example of the use of our nickel-silica catalyst for the cracking of heavy petroleum oils to gasoline, the following data show the results obtained on the cracking of Mid-Continent gas oil of 35.6° A. P. I. gravity:

Cracking temperature_____925° F.
Pressure_____Atmospheric
Volume of feed/volume of
  catalyst space/hour_____1.2
Bbls. of oil charged/ton of
  catalyst/hour_____21.8
Time of contact_____7.7 seconds
Length of run_____6 hours
Weight recovery_____99.3% of oil charged
Once through yields:
  Dry gas_____2.54 weight percent
  Gasoline_____13.7 volume percent
  Recycle stock_____83.0 volume percent
Cubic feet of gas/gal. of gas-
  oline_____28.2
Specific gravity of gas_____0.61
Gasoline characteristics:
  End point_____400° F.
  Gravity_____54.1 A. P. I.
  Knock rating (from
    blends)_____84.3 C. F. R.—M.
  Unsaturation_____77.5%
Recycle oil:
  End point_____706° F.
  Gravity_____35.2 A. P. I.
  Unsaturation_____20.2%

The foregoing data show that the nickel-silica gel catalyst produces a good yield of gasoline with a high knock rating. The once through yield under these conditions was 13.7% and the knock rating 84.3 C. F. R. motor method. Unactivated silica gel in comparison gave a yield of 9.5% and a knock rating of only 72.6 C. F. R. motor method under the same conditions. The remarkable improvement in the knock rating of the gasoline, therefore, must be attributable to the nickel activation of the silica.

The enhanced effectiveness of our new catalyst is not easily explained. We believe, however, that when the silica gel is treated with the nickel salt solution, there occurs a simultaneous adsorption and hydrolysis causing the deposition of a nickel compound on the surface of the silica throughout its entire pore structure. This compound is probably an oxygen compound of nickel such as nickel hydroxide, or more probably, the nickel unites to form a complex compound with the $SiO_2$ molecules and hydrated $SiO_2$ molecules on the surface of the gel and within the pores of the grains thereof. It is believed that the molecules of $SiO_2$ at the surface present unsatisfied valences which form a chemical union with the nickel and its compounds so that the gel treated with nickel salt solution is substantially identical in physical structure with the untreated silica gel excepting that the entire surface, including the immense interior pore surface, is coated with not more than a monomolecular layer of nickel compound. Furthermore, we believe that the electronic structure of the nickel compound on the surface is disturbed by the unbalanced electronic structure of the $SiO_2$, previously referred to as unsatisfied valence, and that in some way the peculiarly high activity of these catalysts is related to their unbalanced electronic structure, or to the molecular orientation of the nickel compound.

As evidence of the hydrolysis of the nickel salt on the surface of the gel, we find that the solution develops a definite acidity which can only be accounted for by the following hydrolytic reaction:

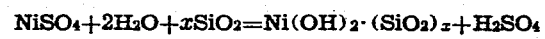
$$NiSO_4 + 2H_2O + xSiO_2 = Ni(OH)_2 \cdot (SiO_2)_x + H_2SO_4$$

We choose to call this reaction an "adsorbolytic" reaction, indicating that the hydrolysis or splitting of the nickel salt is brought about by the adsorption phenomenon. Simultaneously, with the formation of acid in the solution, there is deposited within the silica a measurable amount of nickel compound which we have shown by analysis to vary between about 0.1% to 2% of nickel, depending partly on the concentration of nickel salt solution employed, the hydrogen ion concentration in the solution, and the method of treatment.

Although we prefer to use a nickel salt solution of about 0.1 molar concentration, this may be varied over a considerable range without greatly affecting the amount of nickel deposited within the gel. Thus, we may use concentrations from about 0.02 M to 1.5 M, if desired. We may increase the amount of nickel hydrolyzed by various methods. We may also repeat the treatment of the gel with nickel solution of the same or different concentrations, or we may perform the treatment stagewise in a flowing stream. The nickel salt solution may be made to flow through a series of beds of the gel in rotation so that the most nearly spent solution serves to contact the fresh gel, thus adsorbing the greater amount of the nickel from the solution. The acidity may be adjusted between stages, for example, by adding a base to the solution, sufficient to neutralize the acid liberated by the adsorbolytic action previously mentioned.

In the previous description of our method of preparing our new catalyst, the freshly prepared silica was dried after washing and before treating with the nickel solution. However, it is sometimes desirable to omit this drying step. The freshly made silica which has been thoroughly washed may be immediately treated with the nickel solution and then dried. In this case, however, a longer time is required for diffusion of the solution into the larger pieces of the silica.

Freshly precipitated silica was added to a 0.1 M solution of nickel sulfate and heated for about 2 hours at 200° F. to permit complete penetration and activation of the silica. The silica was then separated and washed with water until free of sulfuric acid. After drying, the catalyst was ready for use. In place of using the sulfate, we may use other soluble salts of nickel, for example, the chloride and nitrate.

As indicated above, the catalyst may be regenerated after it has become fouled with carbonaceous deposits in the cracking operation. Regeneration is most conveniently accomplished by passing a stream of air and inert gas, for example, steam, through the catalyst bed, care being taken to control the oxygen concentration of the regenerating gas so that the combustion temperature is kept below about 1200° F. and preferably below about 1100° F. Excessive heating above these temperatures causes catalyst deterioration.

After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical Mid-Continent residual oil of about 22° A. P. I. gravity, the catalyst may be used for a period of about 30 minutes to 2 hours between regenerations. When using gas oil, we have found that in a typical operation the catalyst activity has decreased about 25% to 50% in a period of 6 hours. In the case of residual oils or very heavy distillate charging stocks, we may initially crack the oil in one catalyst bed and produce intermediate boiling hydrocarbons with very little gasoline. Then we may pass the vapors directly into a second catalyst bed with or without heating to a higher temperature to complete the cracking. The extent or depth of cracking per pass depends chiefly on the freshness of the catalyst, the time of contact, and on the temperature. If desired, the process may be conducted to produce from gas oil about 45% to 55% of gasoline in a single pass and the uncracked products heavier than gasoline may be separated by fractionation and either recycled in the operation or cracked in a secondary cracking operation. Alternatively, the extent of cracking may be maintained about 20% to 30% and the uncracked heavy products may be recycled until completely cracked, the only products being gasoline and gas. Carbonaceous matter produced in the operation, is deposited on the catalyst and removed in regeneration.

If desired, we may employ our catalyst in moving bed apparatus in which a portion of the spent catalyst is continuously withdrawn and regenerated externally, fresh and/or regenerated catalyst being supplied continuously to the apparatus. We may also employ our catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

We have given certain examples of methods of preparing and using our new catalyst. It is clear that other examples might be given and we do not intend that our invention be specifically restricted to those examples given. Thus, when activating silica with a nickel sulfate solution of 0.1 molar concentration, in one case the hydrogen ion concentration was initially adjusted to 3.18 pH. On heating the solution to 190° F., before contacting with the silica, the pH remained unchanged but on contacting with the silica the pH decreased to 2.97 after an hour and remained there throughout the two-hour period of treatment.

We intend that our invention be limited only by the following claims.

We claim:
1. The process of converting heavy hydrocarbon oil into high knock rating gasoline which comprises vaporizing said oil, subjecting the vapors at a temperature between about 700 and 1050° F. to the action of a solid catalyst consisting essentially of active silica promoted with nickel, said silica having been treated with an acid solution of a nickel salt and thereafter washed and dried, withdrawing hydrocarbon vapors from said catalyst and subjecting them to fractionation to separate the gasoline from unconverted hydrocarbons.

2. The process of claim 1 wherein the cracking operation is interrupted periodically and the catalyst is regenerated in situ by treatment with an oxidizing gas.

3. An improvement in the method of preparing cracking catalyst which comprises precipitating active silica by the action of an inorganic acid on the solution of a soluble silicate, treating the silica with an acid solution of a nickel salt whereby nickel is adsorbed on the surface of said silica and thereafter washing until substantially all soluble salts are removed and finally drying the resulting product.

4. An improved cracking catalyst for conversion of heavy hydrocarbon oils into gasoline comprising silica gel promoted with nickel prepared by treating said gel with an acid solution of a soluble nickel salt having a concentration of about .02 to 0.1 molar, washing to remove unadsorbed soluble salts and drying.

5. In the method of making a cracking catalyst by activation of silica gel with a catalytically activating metal, the improvement comprising successively contacting silica gel with acid solutions containing said activating metal in progressively increasing concentration.

6. The process of converting heavy hydrocarbon oils into gasoline which comprises vaporizing said oils and subjecting the vapors thereof at a temperature between about 700 and 1050° F. to the action of a cracking catalyst comprising freshly precipitated silica activated by a film of a nickel compound adsorbed from an acid solution, said catalyst containing about 0.1 to 2% of adsorbed nickel and being substantially free of precipitated nickel compounds.

7. In the method of making a cracking catalyst by activation of active silica with nickel, the improvement comprising successively contacting said silica with acid solutions containing a nickel salt in progressively increasing concentration.

RALPH M. MELAVEN.
RODNEY V. SHANKLAND.